United States Patent

Matoba et al.

[11] Patent Number: 5,838,413
[45] Date of Patent: Nov. 17, 1998

[54] METHOD FOR DISTRIBUTING SPACER PARTICLES ONTO THE SUBSTRATE OF A LIQUID CRYSTAL DISPLAY ELEMENT, A JIG PLATE AND DISTRIBUTING APPARATUS FOR DISTRIBUTION THEREWITH

[75] Inventors: Hirotsugu Matoba, Sakurai; Susumu Hirata, Ikoma-gun; Yorishige Ishii, Yamatotakada; Shingo Abe, Tenri; Hiroshi Onda, Yamatokoriyama; Tetsuya Inui, Nara, all of Japan

[73] Assignee: Sharp Kabushiki Kaisha, Osaka, Japan

[21] Appl. No.: 758,427

[22] Filed: Nov. 29, 1996

[30] Foreign Application Priority Data

Nov. 30, 1995 [JP] Japan ................... 7-312916

[51] Int. Cl.$^6$ ........................... G02F 1/1339
[52] U.S. Cl. ............................ 349/155
[58] Field of Search ................... 349/155, 187, 349/158, 1

[56] References Cited

U.S. PATENT DOCUMENTS 5,629,787  5/1997  Tsubota et al. ................ 349/155

FOREIGN PATENT DOCUMENTS

| 4-46320 | 2/1992 | Japan | 349/155 |
| 4-204417 | 7/1992 | Japan | 349/155 |
| 4-321013 | 11/1992 | Japan | 349/155 |
| 4-322220 | 11/1992 | Japan | 349/155 |
| 6-34982 | 2/1994 | Japan . | |
| 6-67184 | 3/1994 | Japan | 349/155 |

*Primary Examiner*—William L. Sikes
*Assistant Examiner*—Tai V. Duong
*Attorney, Agent, or Firm*—Nixon & Vanderhye

[57] ABSTRACT

Spacer particles are supplied and allocated onto a particle distributing jig plate having numerous spacer particle positioning depressed portions for receiving the spacer particles in a one-to-one correspondence. Then the particle distributing jig plate is made to face, and be registered with, the liquid crystal display element substrate, so that the spacer particles allocated to the depressed portions are transferred to the substrate of a liquid crystal display element.

13 Claims, 11 Drawing Sheets

METHOD FOR DISTRIBUTING SPACER PARTICLES ONTO THE SUBSTRATE OF A LIQUID CRYSTAL DISPLAY ELEMENT, A JIG PLATE AND DISTRIBUTING APPARATUS FOR DISTRIBUTION THEREWITH

BACKGROUND OF THE INVENTION

1. Field of the Invention

The present invention relates to a spacer particle distributing method for distributing spacer particles onto the substrate of a liquid crystal display (LCD) element in the fabrication process for liquid crystal display device, and is also directed to a jig plate and distributing apparatus used for the distributing method.

2. Description of the Prior Art

Conventionally, in the fabrication process for LCD panels, the gap for liquid crystal has been formed by distributing spacer particles onto the LCD display element substrate. The methods for distributing spacer particles generally fall into two schemes (the first and second schemes).

FIG. 1 is a view for illustrating the first scheme for spacer distribution. In this method, spacer particles 103 are mixed with a solvent 102 such as a fluorocarbon gas, alcohol, or the like in a beaker 101, and this solution is ejected as a mist through a spray nozzle 104 into a chamber 105 of the spacer distributor. The sprayed and scattered liquid in the mist form is heated by a heater 106 provided on the side walls of the chamber so that the solvent alone evaporates while spacer particles 103, solely, fall onto an LCD element substrate 100.

FIG. 2 is a view for illustrating the second scheme for spacer distribution. Here, spacers are pneumatically conveyed and ejected with a pressurized gas of 2 to 5 Kg/cm$^2$ as shown in FIG. 2, whereby spacer particles are deposited on the surface of the LCD element substrate. In general, the apparatus used in this method is composed of gas piping systems for weighing, pneumatically conveying and stirring the spacer particles. The distribution of spacer particles is performed in the following manner. First, spacer particles are weighed at a weighing portion 110 and blown into the piping through a manifold 111. Then, the particles are pneumatically conveyed and brought to a nozzle 112 with a pressurizing gas. At nozzle 112, the particles are mixed with the stream of a stirring gas from a gas tank 113 and ejected into chamber 105, so that the spacer particles fall onto LCD display element 100.

However, the first scheme, i.e., the solvent spraying method, has the following problem. When the mist sprayed from spray nozzle 104 evaporates and contracts, the spacer particles contained in the mist tend to approach one another forming clusters. When the size of the mist is markedly large, the liquid component cannot evaporate while the mist is falling inside the chamber but adheres onto the substrate. This creates irregular points with a locally high density of spacer particles, causing appearance defects and other failures.

The second scheme, i.e., the gas-pneumatic conveying/spraying method, has the following problem. When the spacer particles are pneumatically conveyed, the piping hoses and the spacer particles are statically electrified with opposite polarities through the friction therebetween. Therefore, the spacer particles tend to be attracted to the hose walls forming clusters. If these clusters fall and adhere onto the substrate, the gap between the panels cannot be maintained properly, lowering the yield of the resultant liquid crystal panel.

In LCD elements, if spacer particles are located in the pixel area of the LCD substrate, the particles absorb and/or scatter the light that is transmitted through the liquid crystal, degrading the transmittance. This problem is particularly critical for the LCD elements for a projection type television apparatus since the projected image becomes dark. Therefore, the spacer particles must be distributed in the other areas than pixels in order to inhibit the reduction of the transmittance. However, the above two conventional methods are not ones which are able to control the locations of distributed spacer particles, thus causing degradation of the transmittance of light that passes through the liquid crystal.

SUMMARY OF THE INVENTION

The present invention has been devised in order to solve the above problems, and it is therefore an object of the present invention to provide a spacer particle distributing method as well as a distributing apparatus wherein spacer particles can be distributed uniformly to desired locations on the LCD element substrate.

In order to attain the above object, the invention has the following features:

In accordance with a first aspect of the invention, a spacer particle distributing method for distributing spacer particles onto the substrate of a liquid crystal display element of an liquid crystal display device, comprises the steps of:

supplying the spacer particles onto a particle distributing jig plate having a plurality of spacer particle positioning portions by placing the spacer particles into a one-to-one correspondence therewith;

allocating the spacer particles to the spacer particle positioning portions;

making the particle distributing jig plate face, and be registered with, the liquid crystal display element substrate; and transferring the spacer particles allocated to the spacer particle positioning portions, onto the liquid crystal display element substrate.

In accordance with a second aspect of the invention, a spacer particle distributing method has the first feature, and is characterized in that the allocation of the spacer particles to spacer particle positioning portions is performed by attracting the spacer particles with an attracting electrode provided in the spacer particle positioning portions, and the spacer particles are transferred to the substrate of the liquid crystal display element by canceling the attraction to the attracting electrode.

In accordance with a third aspect of the invention, a particle distributing jig plate for use in transferring spacer particles which are supplied to the surface thereof, onto the substrate of a liquid crystal display element of a liquid crystal display device, comprises:

a plurality of spacer particle positioning portions for positioning the spacer particles in a one-to-one correspondence.

In accordance with a fourth aspect of the invention, a particle distributing jig plate having the third feature, is characterized in that at least areas except the spacer particle positioning portions are formed with a charge eraser film for eliminating static charge on the spacer particles.

In accordance with a fifth aspect of the invention, a particle distributing jig plate having the third feature, is characterized in that the spacer particle positioning portions have an attracting electrode for attracting the spacer particles.

In accordance with a sixth aspect of the invention, a particle distributing jig plate having the fourth feature, is characterized in that the spacer particle positioning portions have an attracting electrode for attracting the spacer particles.

In accordance with a seventh aspect of the invention, a particle distributing jig plate having any one of the above third through sixth features, is characterized in the spacer particle positioning portions are depressions formed on the surface thereof.

In accordance with an eighth aspect of the invention, a particle distributing jig plate having the above seventh feature, is composed of a single crystal silicon wafer.

In accordance with a ninth aspect of the invention, a spacer particle distributing apparatus which allocates spacer particles to a particle distributing jig plate having a plurality of spacer particle positioning portions for positioning the spacer particles in a one-to-one correspondence and transferring the spacer particles from the particle distributing jig plate to the substrate of a liquid crystal display element of a liquid crystal device, comprises:

a supplying means for supplying the spacer particles to the particle distributing jig plate; and a driver means for causing the particle distributing jig plate with the spacer particles supplied thereon to face, and be registered with, the liquid crystal display element substrate.

In accordance with a tenth aspect of the invention, a spacer particle distributing jig plate having the ninth feature, is characterized in that at least areas except the spacer particle positioning portions are formed with a charge eraser film for eliminating static charge on the spacer particles.

In accordance with an eleventh aspect of the invention, a spacer particle distributing jig plate having the above ninth feature, is characterized in that the spacer particle positioning portions have an attracting electrode for attracting the spacer particles.

In accordance with a twelfth aspect of the invention, a spacer particle distributing jig plate having the above tenth feature, is characterized in that the spacer particle positioning portions have an attracting electrode for attracting the spacer particles.

In accordance with a thirteenth aspect of the invention, a spacer particle distributing jig plate having any one of the above ninth through twelfth features, is characterized in that the spacer particle positioning portions are depressions formed on the surface thereof.

In accordance with a fourteenth aspect of the invention, a spacer particle distributing jig plate having the above thirteenth feature, is composed of a single crystal silicon wafer.

DESCRIPTION OF THE PREFERRED EMBODIMENTS (1st Embodiment)

Figure 1:
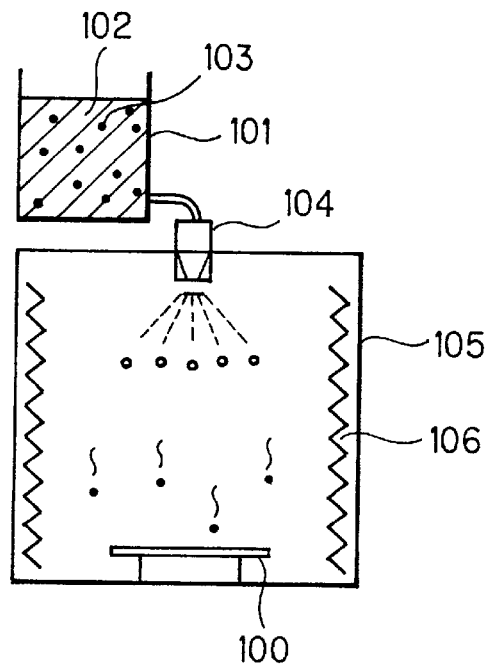
FIG. 1 is a view for illustrating a conventional spacer particle distributing method.
Figure 2:
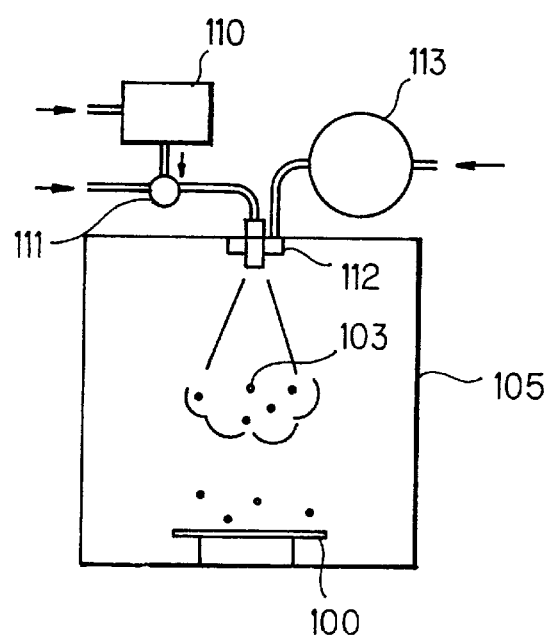
FIG. 2 is a view for illustrating another conventional spacer particle distributing method.
Figure 3A:
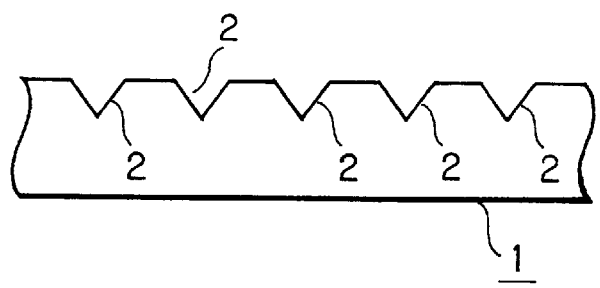
FIGS. 3A through 3G are procedural views showing a spacer particle distributing method in accordance with the first embodiment of the invention.
Figure 4A:
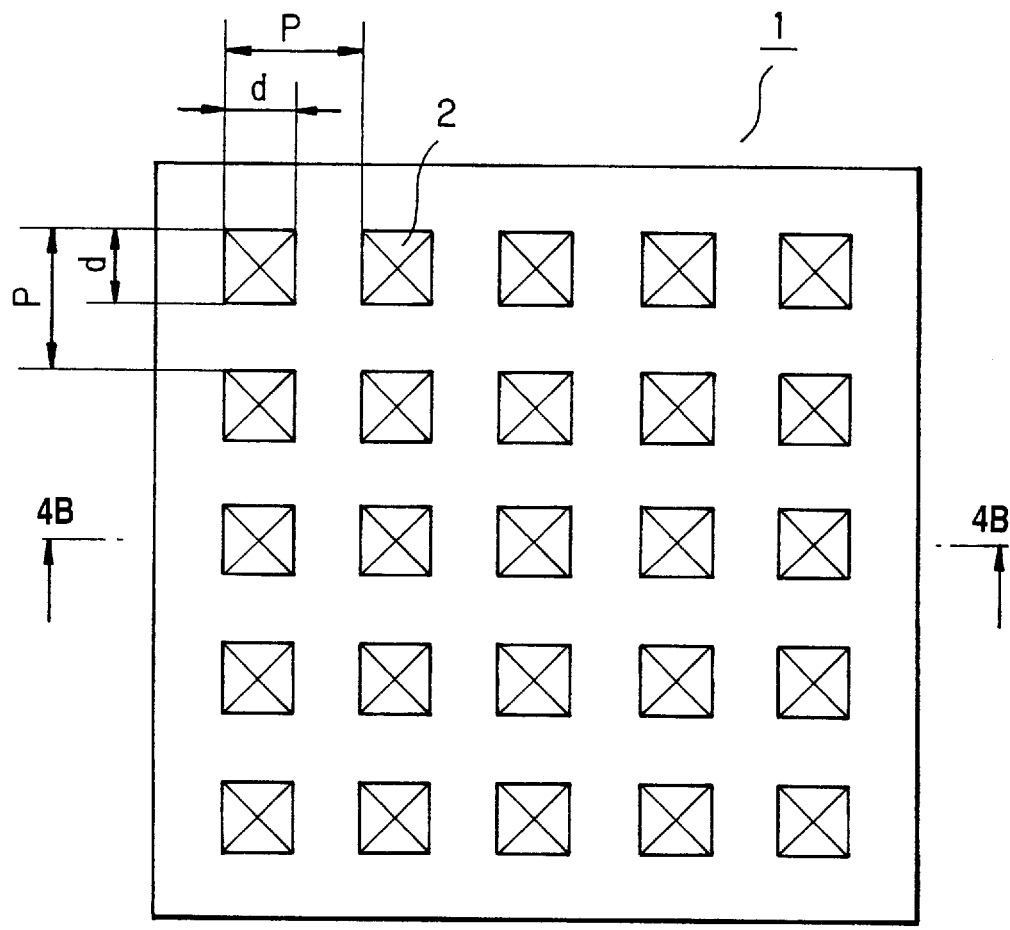
FIG. 4A is a plan view of a particle distributing jig plate used in the first embodiment.
Figure 4B:
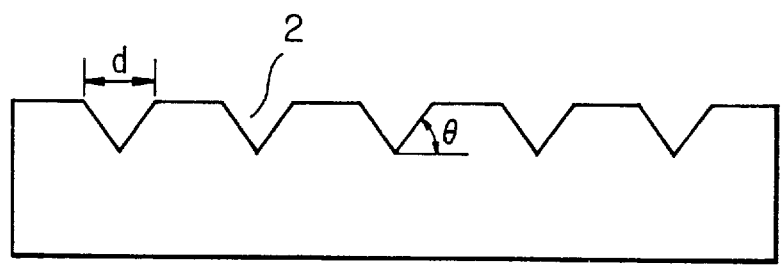
FIG. 4B is a sectional view thereof taken generally about on line 4B—4B in FIG. 4A.
Figure 5:
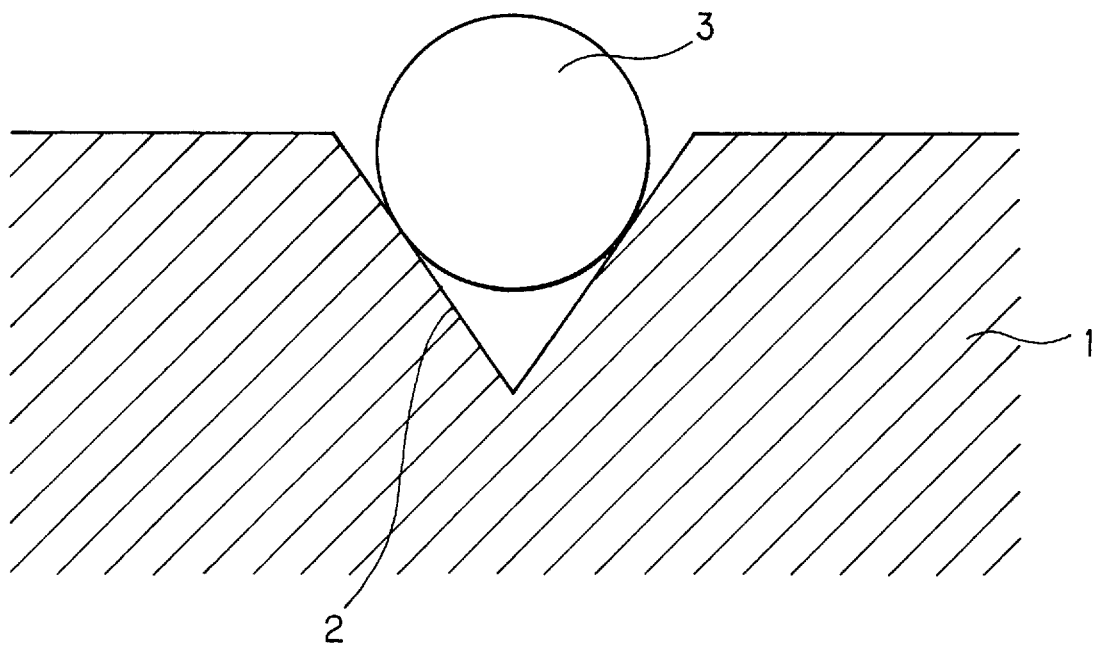
FIG. 5 is an enlarged section view showing the positional relation between a spacer particle and a depressed portion formed on the particle distributing jig plate.
Figure 6:
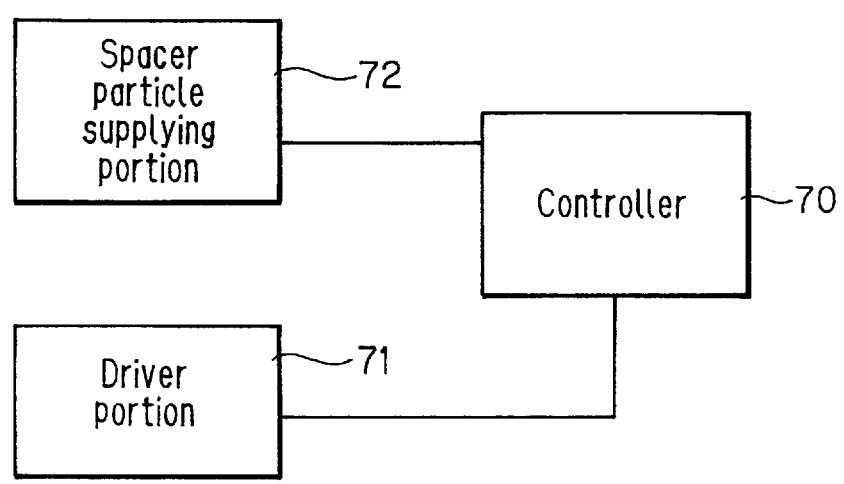
FIG. 6 is a block diagram schematically showing a spacer particle distributing apparatus.

FIGS. 3A through 3G are procedural views for illustrating a spacer particle distributing method in accordance with the first embodiment of the invention. FIG. 4 shows plan and section views showing a configuration of a particle distributing jig plate used in this embodiment. FIG. 5 is an enlarged view showing the positional relation between a spacer particle and a depressed portion formed on the particle distributing jig plate. FIG. 6 is a block diagram showing the configuration of the spacer distributing apparatus of this embodiment. The spacer particle distributing method and the distributing apparatus of this embodiment will be described with reference to the drawings. Referring first to FIG. 3A and FIG. 4, a particle distributing jig plate 1 used in this embodiment will be explained. Particle distributing jig plate 1 is provided with square pyramidal depressed portions (corresponding to spacer particle positioning portions in the present invention) 2 at intervals of a pitch 'p'. The pitch 'p' in this case is set to be equal to the distance between spacer particles to be arranged on an LCD element substrate. Typically, the pitch 'p' is set at 100 $\mu$m. The angle 'θ' for the side facet of depressed portion 2 is set at for example 54.74°. The length 'd' of one side of the opening of depressed portion 2 is set in accordance with the size of a spacer particle 3 in such a way that the topmost point of the spacer particle is positioned above the top surface of particle distributing jig plate 1. For example, when spacer particles having a radius of 6 $\mu$m are used, the length 'd' of the side of the opening is set at 11 $\mu$m or less.

Next, the spacer particle distributing method of this embodiment will be described.

(Step 1)

Figure 3B:
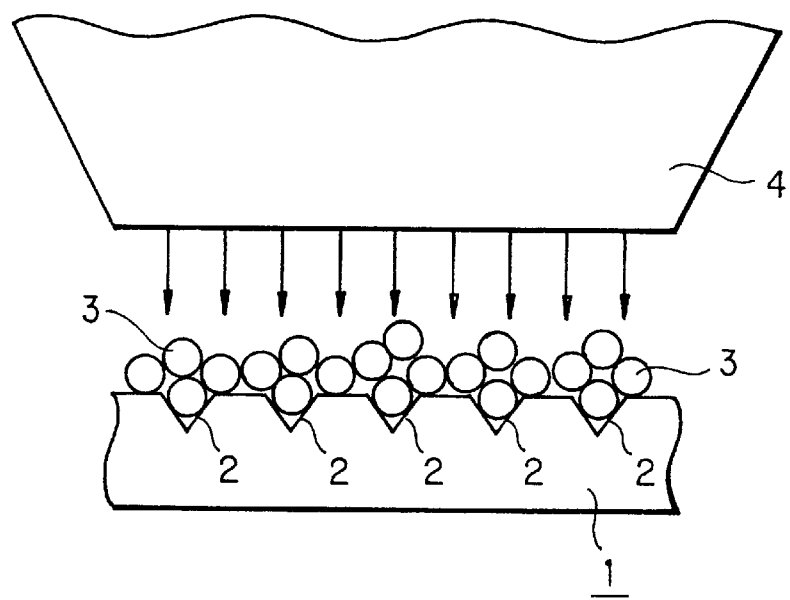

First, in response to instructions from a controller 70 in FIG. 6, spacer particle supplying portion 72 delivers spacer particles 3 of greater number than depressed portions 2 formed on the top surface of particle distributing jig plate 1, from a distribution nozzle 4 shown in FIG. 3B. At this time, some spacer particles 3 fit into depressed portions 2, others remain on the top surface except depressed portions 2 of particle distributing jig plate 1.

(Step 2)

Figure 3C:
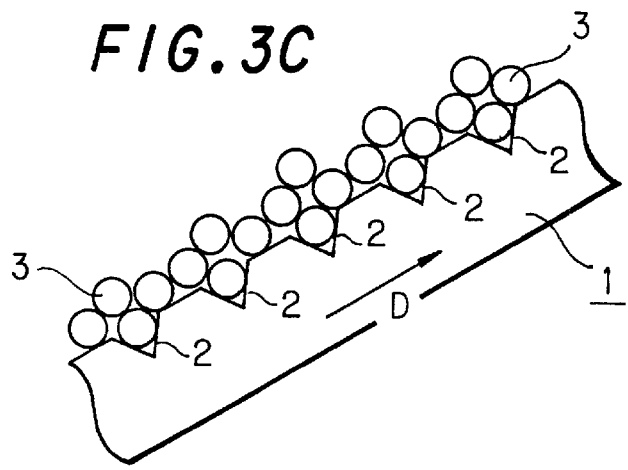
Figure 3D:
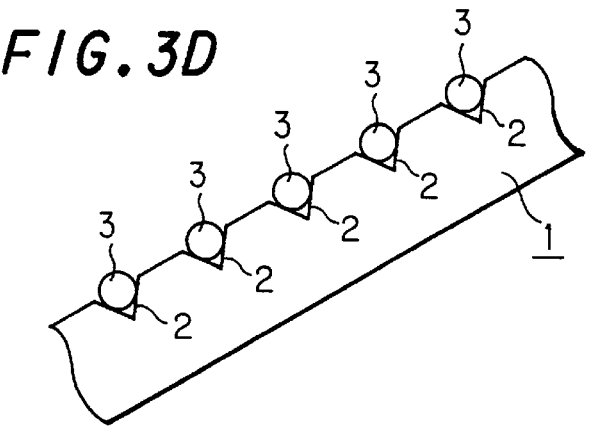

Next, driver portion 71 of FIG. 6, receiving instructions from controller 70, tilts particle distributing jig plate 1 about 30°, for example, as shown in FIG. 3C, and gives vibrations in the directions of arrow D, for example. In this condition, spacer particles 3 deposited over the top surface except depressed portions 2 of particle distributing jig plate 1, or clusters of spacer particles 3 adhering one another from triboelectricity, are thrown out from particle distributing jig plate 1, and only the spacer particles 3 fitting in depressed portions 2 remain therein. As a result, spacer particles 3 are arranged, as shown in FIG. 3D, in a one-to-one in correspondence with depressed portions 2 formed on jig plate 1.

(Step 3)

Figure 3E:
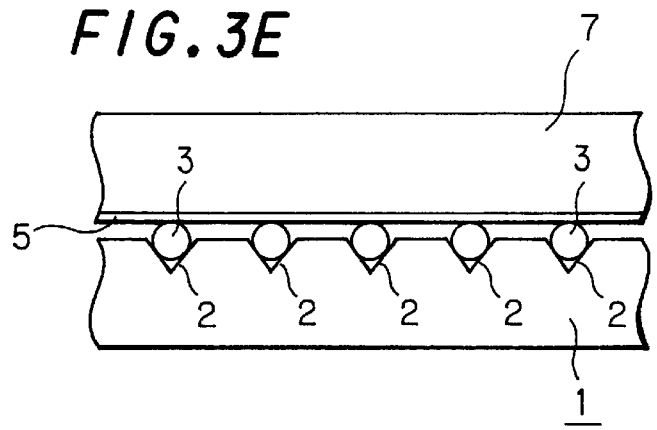

Driver portion 71 returns particle distributing jig plate 1 to the horizontal state as shown in FIG. 3E. Then, driver portion 71 drives an LCD element substrate 7 which previously underwent the aligning treatment, being formed with an oriented membrane 5, so that LCD element substrate 7 is made to face and be registered with particle distributing jig plate 1, whereby oriented membrane 5 of LCD element substrate 7 is brought into contact with the spacer particles on particle distributing jig plate 1.

(Step 4)

Figure 3F:
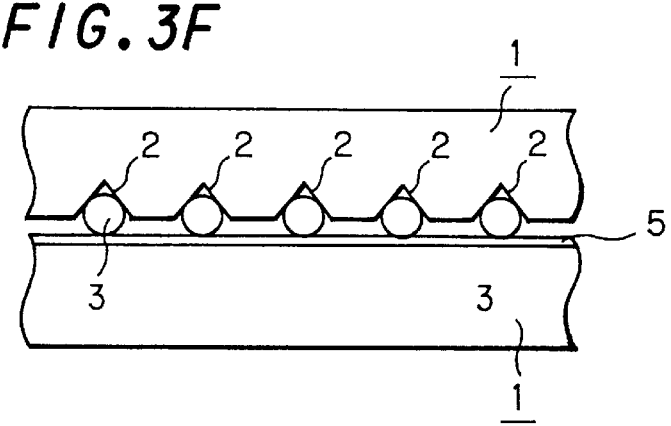

Next, driver portion 71 turns the assembly upside down as shown in FIG. 3F so that LCD element substrate 7 comes underneath relative to particle distributing jig plate 1.

(Step 5)

Figure 3G:
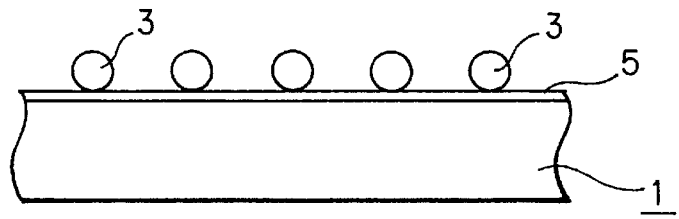

Finally, driver portion 71 separates particle distributing jig plate 1 from LCD element substrate 7 as shown in FIG. 3G so as to transfer spacer particles 3 to the surface of LCD element substrate 7. In this way, it is possible to distribute spacer particles 3 on oriented membrane 5 of LCD element substrate 7.

In the spacer particle distributing method described above, since spacer particles 3 are provided in a one-to-one correspondence with depressed portions 2 of particle distributing jig plate 1, and then the particles thus arranged are transferred whilst being kept in their positions, onto LCD element substrate 7, it is possible to distribute spacer particles 3 uniformly on LCD element substrate 7 without any clusters of spacer particles scattered on LCD element substrate 7, unlike conventional methods. Accordingly, appearance defects and other failures in the LCD device can be inhibited thus making it possible to avoid reduction in the yield due to the failure in controlling the panel gap of the LCD device.

Figure 7A:
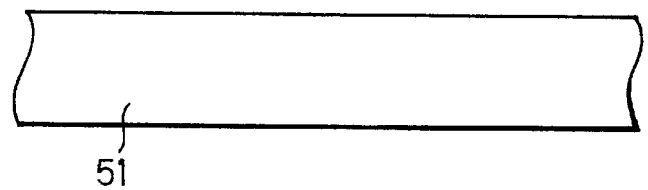
FIGS. 7A through 7E are procedural views for illustrating the fabrication process of a jig plate.

Next, the fabrication method for particle distributing jig plate 1 in this embodiment will be described. FIGS. 7A through 7E are drawings for illustrating the fabrication method. Here, a single crystal silicon wafer 51 having an orientation of the (100) plane, as shown in FIG. 7A, is used to produce a particle distributing jig plate. This wafer 51 is 12 inches, for example, in diameter.

Figure 7B:
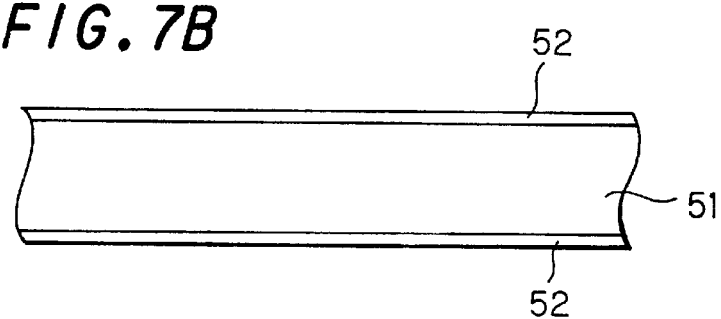
Figure 7C:
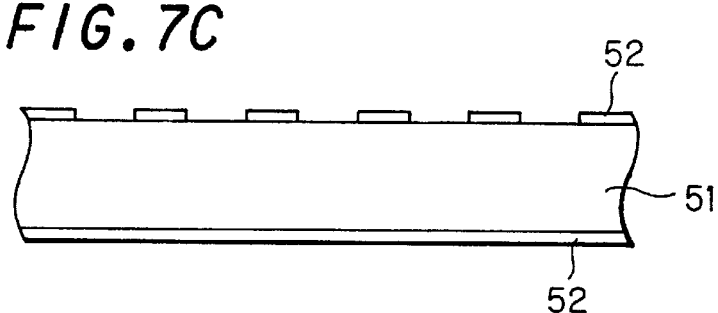
Figure 7D:
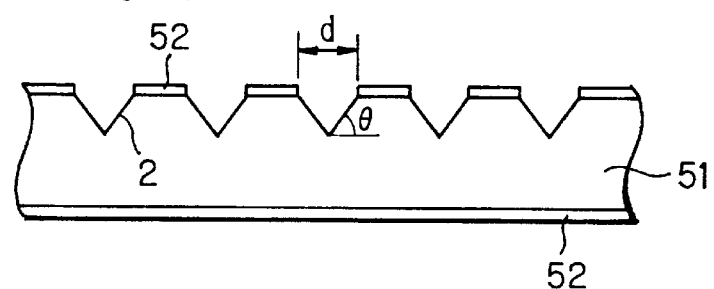
Figure 7E:
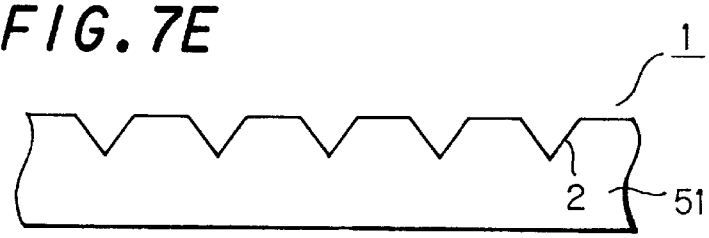

First, as shown in FIG. 7B, a silicon nitride film 52 having a thickness of, for example, 1 $\mu$m is formed on both sides, the front and rear sides of wafer 51 in an LPCVD reaction chamber. Next, silicon nitride film 52 is selectively etched as shown in FIG. 7C, forming opening portions corresponding to depressed portions 2. Then, as shown in FIG. 7D, silicon wafer 51 on which silicon nitride film 52 is thus patterned as a mask, is made to undergo an etching process using potassium hydroxide, an anisotropic etchant. In this anisotropic etching, the etching rate for the orientation of (111) plane is very slow, so that depressed portions 2 of square pyramidal hollows are formed. Finally, as shown in FIG. 7E, silicon nitride film 52 is removed with heated phosphoric acid, thus completing a desired particle distributing jig plate 1.

In the above, a single crystal silicon is used as a material for particle distributing jig plate 1. This is because the angle $\theta$ (=54.74°) for depressed portion 2 which is defined by the angle of the crystal plane, can be very precisely controlled. The width d of the opening can also be patterned with precision if dry etching technique is used. As a result, it is possible to produce the shape of depressed portion 2 in a simple manner with high precision. Accordingly, for all the depressions to be formed on wafer 51, it is possible to very precisely form depressed portions 2 which definitely satisfy the relation between spacer particle 3 and depressed portion 2 (see FIG. 5).

Figure 8A:
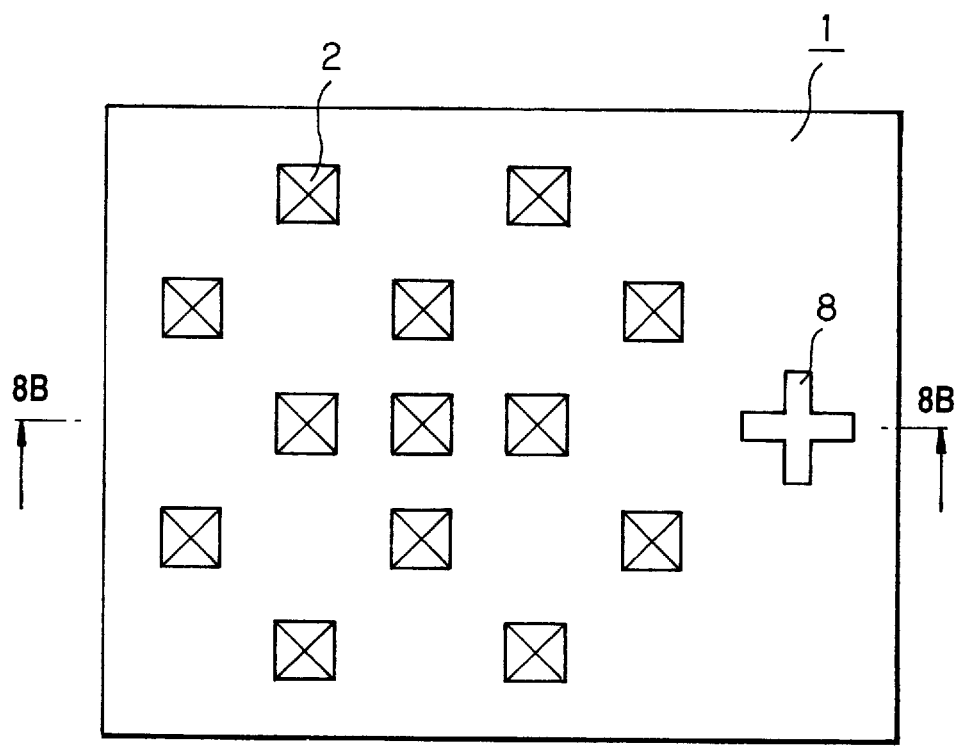
FIG. 8A shows a plan view showing another configuration of a particle distributing jig plate.
Figure 8B:
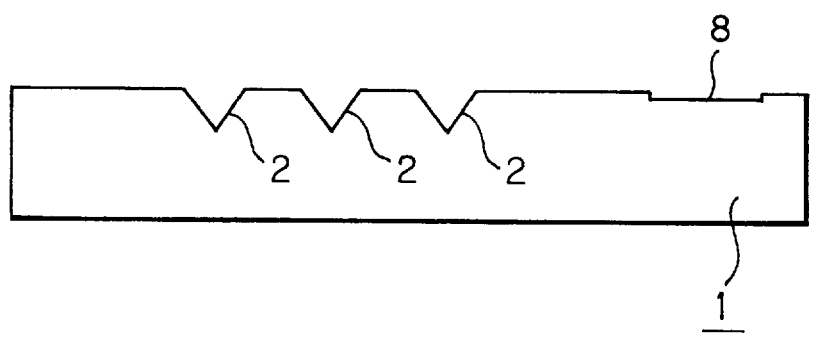
FIG. 8B is a sectional view thereof taken about on line 8B—8B in FIG. 8A.

FIG. 8 shows plan and sectional views showing another example of a particle distributing jig plate in accordance with this embodiment. This particle distributing jig plate designated at 21 has depressed portion 2 with an alignment mark 8. Alignment mark 8 is an indicator for exactly aligning LCD element substrate 7 with particle distributing jig plate 21 in the stage shown in FIG. 3E, and permits spacer particles 3 to be allocated to desired positions on LCD element substrate 7, e.g., areas other than pixel portions or which have no relation to display, whereby it is possible to improve the transmittance of the back light. Particularly when the LCD panel is used for an LCD projection television appliance, this makes the projected image brighter.

Figure 9:
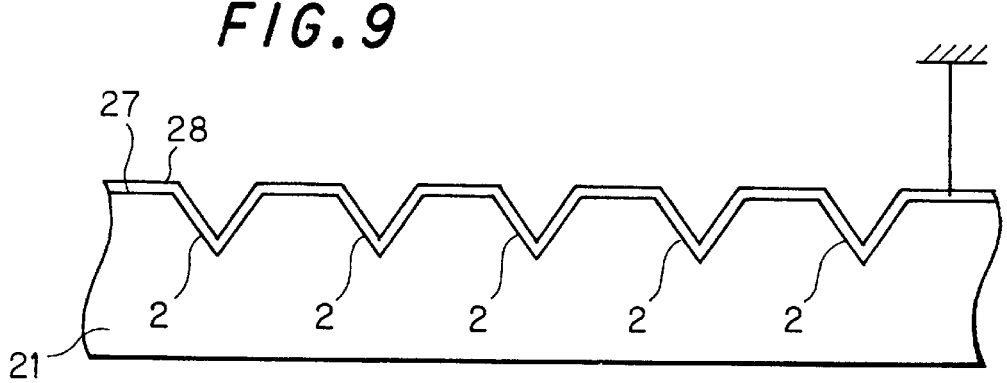
FIG. 9 is a sectional view showing still another configuration of a particle distributing jig plate.
Figure 10:
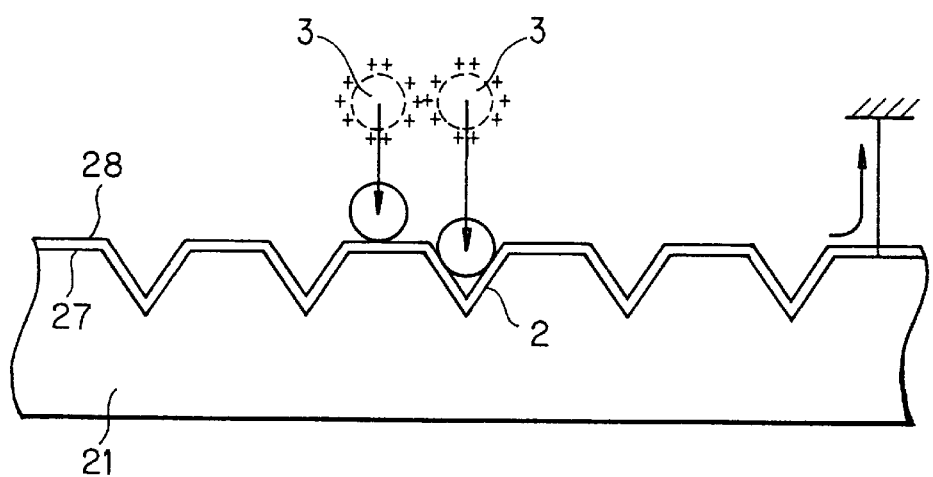
FIG. 10 is a sectional view for illustrating the operation of the particle distributing jig plate shown in FIG. 9.

FIG. 9 is a sectional view showing a further example of a particle distributing jig plate in accordance with this embodiment. Formed on the topmost surface of this particle distributing jig plate 21 is charge eraser film 28 via an insulating layer 27. Charge eraser film 28 is made up of a material having a low electric resistance (e.g. a metal) and constantly grounded, as shown in FIG. 9. The provision of particle distributing jig plate 21 thus configured, is able to eliminate the static charge generated from the friction during the conveyance of spacer particles 3 to the distribution nozzle. Specifically, when spacer particles 3 with static electricity, come in contact with charge eraser film 28 on particle distributing jig plate 21, as shown in FIG. 10, static charge on spacer particles 3 flows to the earth and is erased. In this way, until the end of the step shown in FIG. 3C, or step 2 in which excessive spacer particles 3 are thrown away by giving vibrations in the directions of D in the spacer distributing stage, it is possible to inhibit charged spacer particles 3 from sticking to, and remaining on, the top surface excepting depressed portions 2 due to electrostatic force.

(2nd Embodiment)

Figure 11:
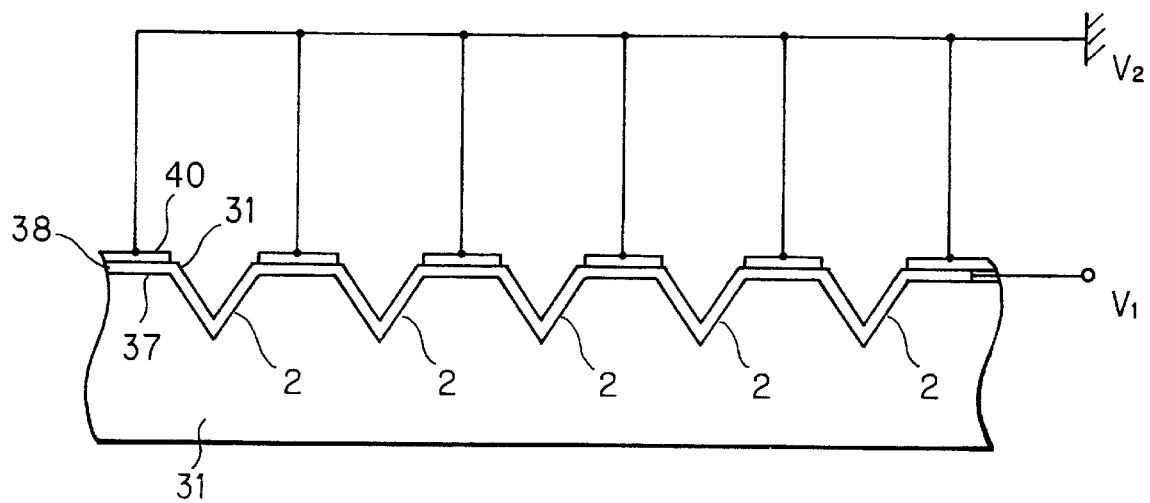
FIG. 11 is a sectional view showing a particle distributing jig plate used in the second embodiment.

FIG. 11 is a sectional view showing a configuration of a particle distributing jig plate used in the second embodiment of the invention. A particle distributing jig plate 31 has depressed portions 2 in a like manner to the first embodiment. Provided on the surface of jig plate 31 is an attracting electrode 38 via a first insulating layer 37. Further, a charge eraser film 40 is provided on the topmost via a second insulating layer 39. Charge eraser film 40 is made up of a material having a low electric resistance (e.g. a metal) and provided on the top surface of particle distributing jig plate 31 excepting depressed portions 2. The charge eraser film 40 (the potential V2) is grounded constantly. Attracting electrode 38 can be applied with an arbitrary voltage V1.

Figure 12A:
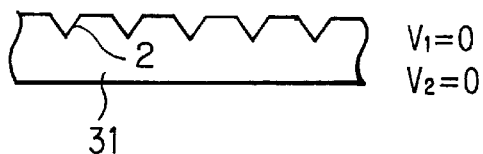
FIGS. 12A through 12G are sectional views for illustrating a spacer particle distributing method in accordance with the second embodiment.

FIGS. 12A through 12G are procedural views for illustrating a spacer particle distributing method using this particle distributing jig plate 31. In these figures, jig plate 31 of FIG. 11 is simplified as shown in FIG. 12A. In the following description, the distributing process of this embodiment will be described with reference to FIGS. 12A through 12G. Since this distributing process is almost the same as in the first embodiment, the description will be made of only the potential control of the voltage V1 of attracting electrode 38 and the voltage V2 of charge eraser electrode 40 on particle distributing jig plate 31 as well as their functions. Here, charge eraser electrode 40 (the voltage V2) is grounded and constantly kept at 0 volt.

Figure 12D:
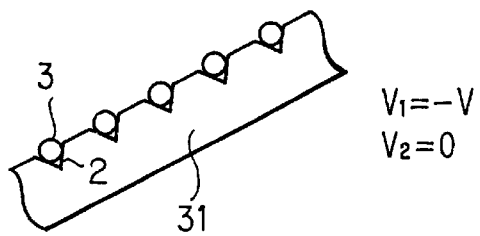
Figure 12B:
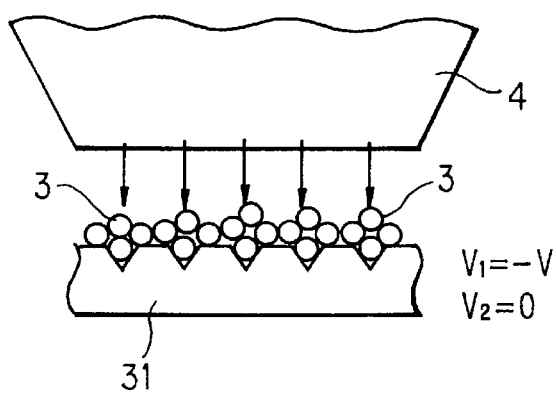
Figure 13:
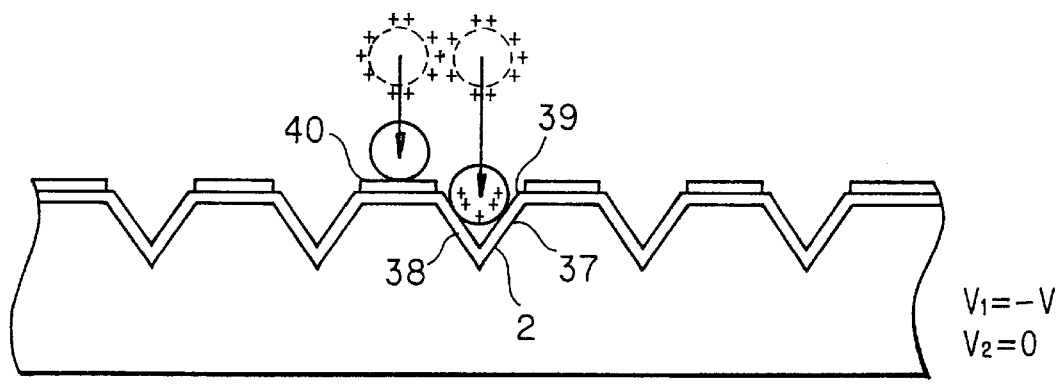
FIG. 13 is a sectional view for illustrating an operation of the particle distributing jig plate shown in FIG. 11.

In the step shown in FIG. 12B (the above step 1), spacer particles 3 are supplied to particle distributing jig plate 31. At this moment, the voltage V1 of attracting electrode 38 is set at a negative voltage, for example, −V (volt). The motion of spacer particles 3 electrified with positive charges as in this case will be described with reference to FIG. 13. If a spacer particle with positive charges falls in a depressed portion 2 on particle distributing jig plate 31, the particle is attracted to the depressed portion 2 by electrostatic force since a negative potential (V1) of −V (volt) is applied to attracting electrode 38 in depressed portions. For other positively charged spacer particles 3 which fall on charge eraser electrode 40 except depressed portions 2, the static charge is removed since charge eraser electrode 40 (the voltage V2) is grounded.

Figure 14:
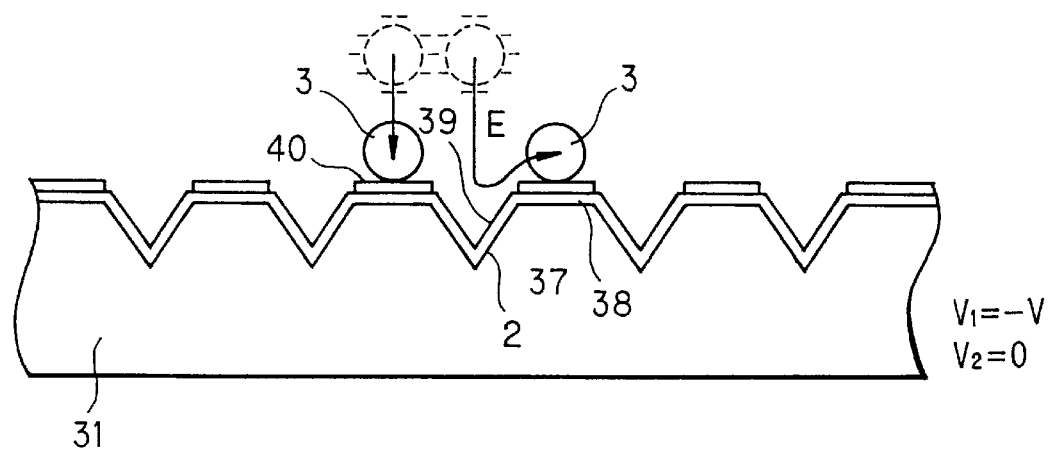
FIG. 14 is a sectional view for illustrating another operation of the particle distributing jig plate shown in FIG. 11.

In contrast, when a spacer particle with negative charges falls in a depressed portion 2 on particle distributing jig plate 31, the particle is expelled and excluded, as indicated by arrow E in FIG. 14, from the depressed portion 2 due to the repulsive electrostatic force. The thus discharged spacer particles fall on charge eraser electrode 40 where the static charge is eliminated. For other negatively charged spacer particles 3 which fall on charge eraser electrode 40 except depressed portions 2, the static charge is removed since charge eraser electrode 40 (the voltage V2) is grounded.

Figure 12E:
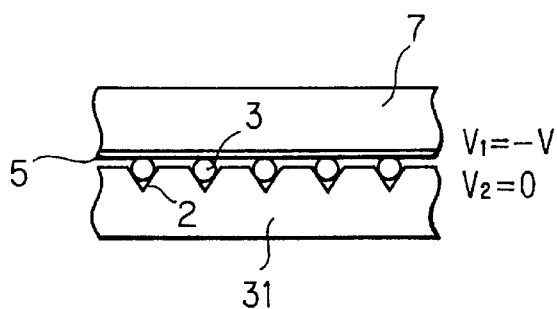
Figure 12C:
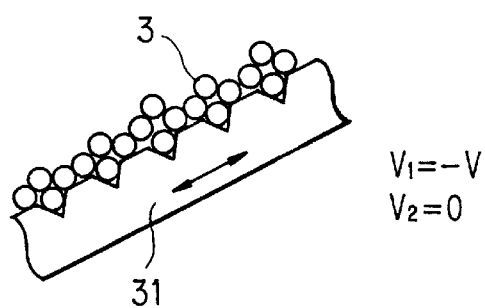
Figure 12F:
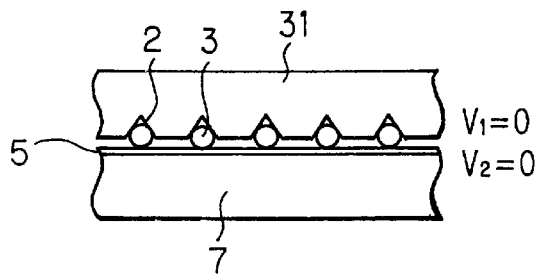
Figure 15:
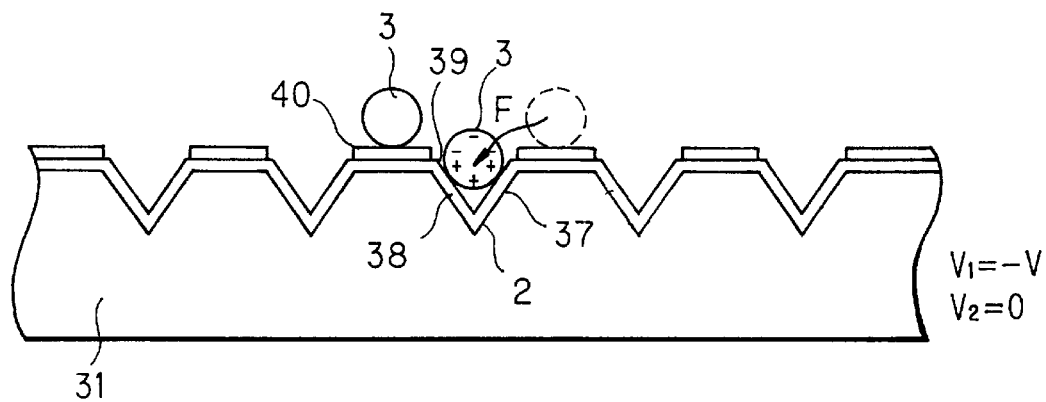
FIG. 15 is a sectional view for illustrating a further operation of the particle distributing jig plate shown in FIG. 11.

Next, particle distributing jig plate 31 is vibrated as shown in FIG. 12C (the above step 2). During this, spacer particles 3 on charge eraser electrode 40 have not been electrified, so that these particles are easily thrown out from particle distributing jig plate 31. In this step, as shown in FIG. 15, the spacer particle 3 which has fallen in a depressed portion 2 as indicated by arrow F, for example, is electrostatically induced by attracting electrode 38 which has a negative potential (V1) of −V (volt) applied, and therefore attracted to the electrode. Since attracting electrode 38 is kept supplied with the negative voltage (V1) of −V (volt), spacer particles 3, once attracted, remain attracted to depressed portions 2 by electrostatic force. Accordingly, spacer particles 3 fitting in depressed portions 2 will remain attracted therein even if a stronger vibration than given in the step of FIG. 3C in the first embodiment is imparted to this configuration. As a result, as shown in FIG. 12D, it is possible to allocate spacer particles 3 to all the depressed portions 2 without leaving any spacer particles 3 in the area excepting depressed portions 2 on particle distributing jig plate 31.

Figure 12G:
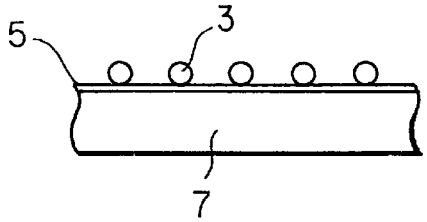

In the step shown in FIG. 12E (the above step 3), the potential V1 of attracting electrode 38 remains applied at −V (volt). At the step of FIG. 12F (the above step 4), attracting electrode 38 (the voltage V1) is grounded. This means that the potential of electrode 38 becomes equal to the potential V2 of charge eraser electrode 40. At this moment, electrostatic induction between spacer particles 3 fitting in depressed portions and attracting electrode 38 is canceled. Therefore, as shown in FIG. 12G, spacer particles 3 fall due to gravity or are transferred to LCD element substrate 7 by electrostatic force generated due to the electrification on LCD element substrate 7. As a result, the spacer particles are distributed uniformly.

In the above, description was made of the spacer particle distributing process which is almost the same as in the first embodiment, but methods of distributing should not limited to the above process. The following distributing method may be adopted, for example.

FIG. 16A through 16F are procedural views for illustrating this process of distributing spacer particles. In this distributing process, charge eraser electrode 40 (the potential V2) is grounded in all the steps shown in FIGS. 16A through 16F, or the potential V2 is kept at zero volt. Here, particle distributing jig plate 31 is set, and used, with its depressed portions facedown.
(Step 11)

Figure 16A:
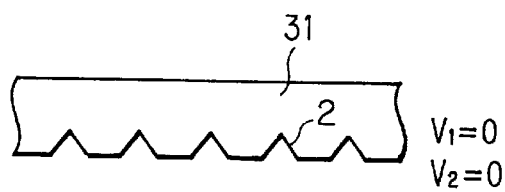
FIG. 16A through 16F are procedural views for illustrating another spacer particle distributing method using the particle distributing jig plate shown in FIG. 11.
Figure 16B:
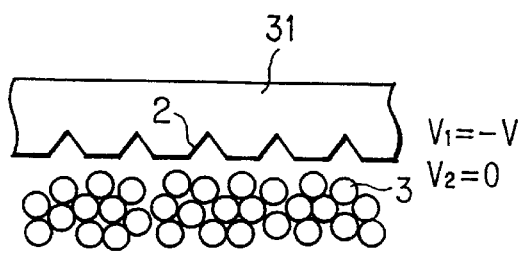
Figure 16C:
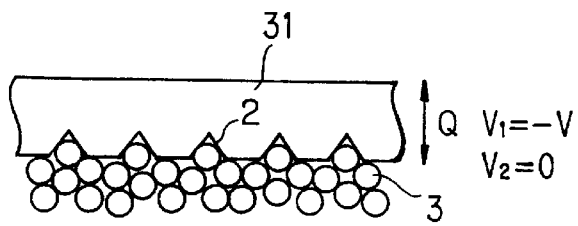
Figure 16D:
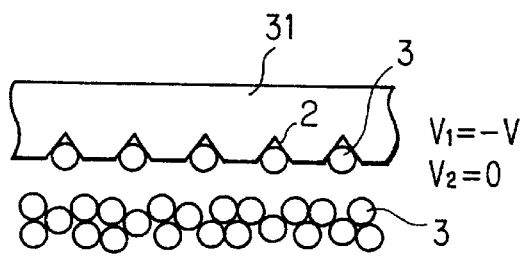

As shown in FIG. 16B, particle distributing jig plate 31 is made to approach at least a greater number of spacer particles 3 than that of depressed portions 2, and moved back and forth in the directions of arrow Q so that it presses against spacer particles 3 several times. During this operation, for the spacer particles 3 which come in contact with the area of charge eraser electrode 40 except depressed portions, the static charge is canceled since charge eraser electrode 40 (the potential V2) is grounded. Since the potential V1 of the attracting electrode is set at a negative voltage of e.g. −V (volt), positively charged spacer particles 3 are attracted to depressed portions 2. Negatively charged spacer particles 3 are expelled and excluded from the depressed portions 2 due to the repulsive electrostatic force and the static charge is eliminated by charge eraser electrode 40. The thus discharged or changeless spacer particles 3 fall into depressed portions 2 and electrostatically induced by attracting electrode 38 kept at a negative voltage (V1) of −V (volt) and attracted to the electrode. Finally, as shown in FIG. 16D, it is possible to reliably allocate spacer particles 3 to all the depressed portions 2 without leaving any spacer particles 3 in the area except depressed portions 2 on particle distributing jig plate 31.
(Step 12)

Figure 16E:
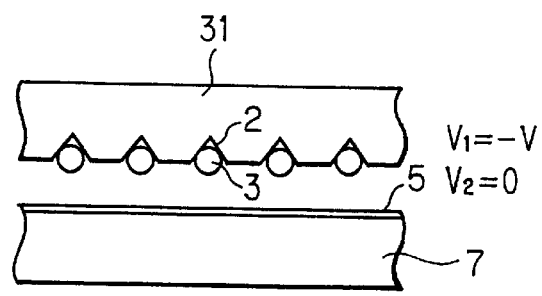

Next, in the stage of FIG. 16E, particle distributing jig plate 31 is positioned above LCD element 7 whilst spacer particles 3 are definitely held in depressed portions 2 with attracting electrode 38 kept at a potential (V1) of −V (volt).
(Step 13)

Figure 16F:
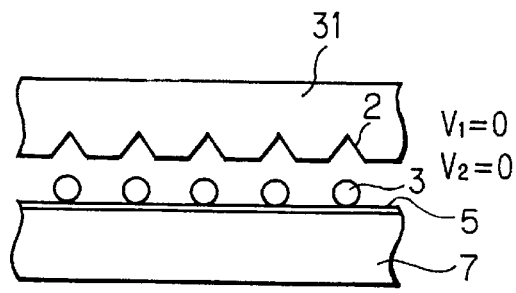

Finally, in the step of FIG. 16F, attracting electrode 38 is grounded so that the potential V1 of it is equalized to the potential V2 of charge eraser electrode 40. At this moment, electrostatic induction between spacer particles 3 fitting in depressed portions 2 and attracting electrode 38 is canceled, and therefore the attracting force stops. Spacer particles 3 then fall due to gravity or are transferred to LCD element substrate 7 by electrostatic force generated from the electrification on LCD element substrate 7. As a result, the spacer particles are distributed uniformly.

Thus, in this embodiment, since the spacer particles are attracted into depressed portions 2 by applying a voltage to attracting electrode 38, it is possible to definitely position spacer particles 3 into depressed portions 2. Since the spacer particles adhering to the area excepting depressed portions 2 can be thrown out by a strong vibration, no spacer particle 3 will be provided to unwanted areas on LCD element substrate 7, thus it is possible to avoid degrading the quality of image of the resultant LCD panel.

As has been apparent from the above embodiments, the present invention provides the following effects.

First, in accordance with a spacer particle distributing method, spacer particles are once arranged into predetermined positions on a particle distributing jig plate, and then transferred to an LCD substrate with the arrangement maintained. Therefore, it is possible to inhibit the formation of clusters of the spacer particles. As a result, it is possible to prevent generation of appearance defects or other failures in the LCD element. Further, it is possible to eliminate reduction in the yield due to the failure in controlling the panel gap.

In accordance with a second spacer particle distributing method, since spacer particles are positioned using an attracting electrode, spacer particles are definitely allocated onto a particle distributing jig plate, thus making it possible to distribute the spacer particles onto an LCD substrate in a very uniform manner.

Next, if in a particle distributing jig plate, positioning portions are formed uniformly in a desired density, spacer particles can be positioned and held at the portions. Therefore, it is possible to distribute spacer particles on an LCD element substrate uniformly in a desired density.

Further, in accordance with a spacer particle distributing apparatus of the invention, since the particle distributing jig plate has a charge eraser film for eliminating static charge on spacer particles, there is no concern that the spacer particles may stick to unwanted areas on the particle distributing jig plate due to electrostatic force. Thus, it becomes possible to place spacer particles definitely to predetermined positions.

Next, in a particle distributing jig plate of the invention, since it has an attracting electrode for attracting spacer particles, spacer particles can be definitely adsorbed to predetermined positions by the function of this attracting electrode. Accordingly, it is possible to reliably hold spacer particles at predetermined positions when the spacer particles sticking to unwanted areas on the particle distributing jig plate are thrown out by strong vibrations.

Further, since the particle distributing jig plate of the invention is formed of a single crystal silicon substrate, it is possible to perform anisotropic etching using potassium hydroxide for forming the depressed portions. Accordingly, depressed portions with 5 μm or more in depth which is impossible to be formed by a normal dry-etching apparatus, can be formed in a simple way with high precision.

Moreover, in accordance with a spacer particle distributing apparatus, spacer particles of some μm to some tens μm in diameter can be distributed uniformly at desired positions on an LCD substrate.

What is claimed is:

1. A spacer particle distributing method for distributing spacer particles onto the substrate of a liquid crystal display element of a liquid crystal display device, comprising the steps of:

supplying the spacer particles onto a particle distributing jig plate having a plurality of spacer particle positioning portions by placing the spacer particles into a one-to-one correspondence therewith;

allocating the spacer particles to the spacer particle positioning portions;

the step of allocating including displacing the particle distributing jig plate to remove from the jig plate spacer particles misaligned with spacer particle positioning portions of said jig plate;

registering the particle distributing jig plate in face-to-face relation with the liquid crystal display element substrate; and transferring the spacer particles allocated to the spacer particle positioning portions, onto the liquid crystal display substrate.

2. A spacer particle distributing method according to claim 1 wherein the step of transferring includes inverting the registering article distributing jig plate and liquid crystal display element substrate to position the spacer particles on the liquid crystal display element substrate at positions corresponding to the spacer particle positioning portions on the particle distributing jig plate.

3. A method according to claim 1 wherein the step of displacing includes vibrating the jig plate to remove said misaligned particles.

4. A method according to claim 1 wherein the step of displacing includes tilting the jig plate to remove said misaligned particles.

5. A spacer particle distributing apparatus which allocates spacer particles to a particle distributing jig plate having a plurality of spacer particle positioning portions for positioning the spacer particles in a one-to-one correspondence and transferring the spacer particles from the particle distributing jig plate to the substrate of a liquid crystal display element of a liquid crystal device, comprising:

a supplying means for supplying the spacer particles to the particle distributing jig plate;

means for displacing the particle distributing jig plate with spacer particles supplied thereto to remove spacer particles misaligned with said spacer particle positioning portions; and a driver means for causing the particle distributing jig plate with the spacer particles supplied thereon to face, and be registered with, the liquid crystal display element substrate.

6. A spacer particle distributing method for distributing spacer particles onto the substrate of a liquid crystal display element of a liquid crystal display device, comprising the steps of:

supplying the spacer particles onto a particle distributing jig plate having a plurality of spacer particle positioning portions by placing the spacer particles into a one-to-one correspondence therewith;

allocating the spacer particles to the spacer particle positioning portions;

registering the particle distributing jig plate in face-to-face relation with the liquid crystal display element substrate; and transferring the spacer particles allocated to the spacer particle positioning portions, onto the liquid crystal display substrate;

the step of allocating the spacer particles to spacer particle positioning portions including attracting the spacer particles with an attracting electrode provided in the spacer particle positioning portions, and cancelling the attraction of the spacer particles to the attracting electrode to transfer the spacer particles allocated to the spacer particle positioning portions to the substrate of the liquid crystal display element.

7. A particle distributing jig plate for use in transferring spacer particles which are supplied to the surface thereof, onto the substrate of a liquid crystal display element of a liquid crystal display device, comprising:

a plurality of spacer particle positioning portions on said particle distributing jig plate for positioning the spacer particles in a one-to-one correspondence with said liquid crystal display element, the spacer particle positioning portions having an attracting electrode for attracting the spacer particles to said jig plate.

8. A particle distributing jig plate for use in transferring spacer particles which are supplied to the surface thereof, onto the substrate of a liquid crystal display element of a liquid crystal display device, comprising:

a plurality of spacer particle positioning portions on said particle distributing jig plate for positioning the spacer particles in a one-to-one correspondence with said liquid crystal display element, at least areas except the spacer particle positioning portions being formed with a charge eraser film for eliminating static charge on the spacer particles, the spacer particle positioning particles having an attracting electrode for attracting the spacer particles.

9. A particle distributing jig plate according to claim 8, wherein the spacer particle positioning portions are depressions formed on the surface thereof.

10. A particle distributing jig plate for use in transferring spacer particles which are supplied to the surface thereof, onto the substrate of a liquid crystal display element of a liquid crystal display device, comprising:

a plurality of spacer particle positioning portions on said particle distributing jig plate for positioning the spacer particles in a one-to-one correspondence with said liquid crystal display element;

said spacer particle positioning portions comprising depressions formed on the surface thereof; and said particle distributing jig plate being composed of a single crystal silicon wafer.

11. A spacer particle distributing apparatus which allocates spacer particles to a particle distributing jig plate having a plurality of spacer particle positioning portions for positioning the spacer particles in a one-to-one correspondence and transferring the spacer particles from the particle distributing jig plate to the substrate of a liquid crystal display element of a liquid crystal device, comprising:

a supplying means for supplying the spacer particles to the particle distributing jig plate; and a driver means for causing the particle distributing jig plate with the spacer particles supplied thereon to face, and be registered with, the liquid crystal display element substrate;

said spacer particle positioning portions having an attracting electrode for attracting the spacer particles to said jig plate.

12. A spacer particle distributing apparatus which allocates spacer particles to a particle distributing jig plate having a plurality of spacer particle positioning portions for positioning the spacer particles in a one-to-one correspondence and transferring the spacer particles from the particle distributing jig plate to the substrate of a liquid crystal display element of a liquid crystal device, comprising:

a supplying means for supplying the spacer particles to the particle distributing jig plate; and a driver means for causing the particle distributing jig plate with the spacer particles supplied thereon to face, and be registered with, the liquid crystal display element substrate;

said spacer particle positioning portions comprising depressions formed on the surface thereof and said particle distributing jig plate is composed of a single crystal silicon wafer.

13. A spacer particle distributing jig plate according to claim 5, wherein at least areas except the spacer particle positioning portions are formed with a charge eraser film for eliminating static charge on the spacer particles.

* * * * *